(12) United States Patent
Keszler et al.

(10) Patent No.: US 6,419,855 B1
(45) Date of Patent: Jul. 16, 2002

(54) PHOSPHOR SYSTEM

(75) Inventors: Douglas A. Keszler, Corvallis, OR (US); Dong Li, Newark, DE (US); John F. Wager; Benjamin L. Clark, both of Corvallis, OR (US); Paul D. Keir, Portland, OR (US)

(73) Assignee: The State of Oregon Acting by and through the State Board of Higher Education on behalf of Oregon State University, Corvallis, OR (US)

(*) Notice: Subject to any disclaimer, the term of this patent is extended or adjusted under 35 U.S.C. 154(b) by 0 days.

(21) Appl. No.: 09/398,604

(22) Filed: Sep. 16, 1999

Related U.S. Application Data
(60) Provisional application No. 60/100,517, filed on Sep. 16, 1998.

(51) Int. Cl.$^7$ .......................... C07K 11/56; C07K 11/54; C07K 11/55; H05B 33/14
(52) U.S. Cl. .......................... 252/301.65; 252/301.65; 313/503
(58) Field of Search ................. 313/503; 252/301.65, 252/301.45

(56) References Cited

U.S. PATENT DOCUMENTS

| | | | |
|---|---|---|---|
| 3,617,332 A | 11/1971 | Lehmann | 117/33.5 C |
| 4,374,037 A | 2/1983 | Takahashi | 252/301.45 |
| 4,377,769 A | 3/1983 | Beatty et al. | 313/495 |
| 4,651,054 A | 3/1987 | Itou et al. | 313/468 |
| 4,725,344 A | 2/1988 | Yocom et al. | 204/192.15 |
| 4,741,993 A | 5/1988 | Kano et al. | 430/536 |
| 4,874,985 A | 10/1989 | Hase et al. | 313/487 |
| 5,554,449 A | 9/1996 | Tonomura et al. | 425/690 |
| 5,669,802 A | 9/1997 | Potter | 445/24 |
| 5,788,881 A | 8/1998 | Chadha et al. | 252/301.4 R |
| 5,939,825 A | 8/1999 | Sun et al. | 313/503 |

FOREIGN PATENT DOCUMENTS

| | | |
|---|---|---|
| EP | 0 057 610 A2 | 8/1982 |
| GB | 2319777 A | 3/1998 |
| JP | 60-147490 * | 8/1985 |
| JP | 85039310 B2 * | 9/1985 |
| JP | 8-88086 A | 4/1996 |

* cited by examiner

Primary Examiner—C. Melissa Koslow
(74) Attorney, Agent, or Firm—Klarquist Sparkman, LLP

(57) ABSTRACT

Phosphor compositions of the formula $Zn_{1-3x/2}M_xX:Mn$, wherein M is selected from the group consisting of the trivalent cations of Al, In, Ga, and mixtures thereof, and X is selected from the group consisting of S, Se, Te, and mixtures thereof are disclosed. Also disclosed are phosphor compositions of the formula, MX:Cu,L,A wherein M is selected from the divalent ions of Sr, Mg, Ca, Ba, X is selected from the group consisting of S, Se, Te, and mixtures thereof, and mixtures thereof, L is selected from the group consisting of the trivalent cations of the lanthanides, Al, In, Ga, Sc, and mixtures thereof, and A is selected from the alkali metal ions or mixtures thereof. Emission chromaticity of the phosphors is controlled by varying codopant concentrations. Electroluminescent devices comprising the phosphors also are disclosed.

21 Claims, 5 Drawing Sheets

PHOSPHOR SYSTEM

This application claims the benefit of U.S. Provisional Application No. 60/100,517, filed Sep. 16, 1998, incorporated herein by reference.

This invention was made with support from the National Science Foundation, contract number OSU #50341A. The government has certain rights in this invention.

TECHNICAL FIELD

This invention relates to electroluminescent phosphor compositions that may be used for AC Thin Film Electroluminescent (ACTFEL) devices. This invention also relates to a crystal engineering method that allows chromatic control of phosphor emission across the visible spectrum. The invention further relates to luminescent devices produced from such phosphor compositions.

BACKGROUND OF THE INVENTION

Commercial electroluminescent (EL) devices are desirable for their wide viewing angles, crisp resolution, high contrast ratios, and durability. However, monochrome output and the unavailability of a suitable red-green-blue phosphor set have hampered widespread utility of electroluminescent devices.

At present, commercial flat-panel EL devices operate on the basis of the amber emission from thin films of the phosphor ZnS:Mn. In order to realize full color output, suitable phosphors broadly emitting in the blue and yellow portions of the spectrum can be combined to produce a solid-state EL source of white light. The white emission from such phosphor combinations is then passed through appropriate color shutters. The drawback to this technique is that the light is greatly attenuated by passage through such shutters. In order to replicate the performance of a cathode-ray tube, it would be advantageous to provide efficient EL-active red, green, and blue phosphors having specific chromaticity values.

SUMMARY OF THE INVENTION

The phosphor compositions described herein provide efficient, electroluminescently active phosphors that may be used to provide a phosphor set that is substantially red, green, blue.

The crystal engineering methods of the invention provide chromaticity control that may be used to provide a highly efficient red, green, and blue phosphor set for electroluminescence applications.

A phosphor material is of the formula $Zn_{1-3x/2}M_xX:Mn$, wherein M is selected from the group consisting of the trivalent cations of Al, In, Ga, and mixtures thereof, and X is selected from the group consisting of S, Se, Te, and mixtures thereof. Most advantageously X is sulfur. The phosphor material exhibits a systematic red shift of its emission as x varies from 0.01 to 0.49. The amount of Mn can be 0.5 to 5.0 mol %, but control of the emission maximum is achieved by changing the amount of trivalent cation. The phosphor material can be used in a variety of electroluminescent devices.

Another phosphor material is of the formula MX:Cu, L, A wherein M is selected from the divalent ions of Sr, Mg, Ca, Ba, and mixtures thereof, X is selected from the group consisting of S, Se, Te, and mixtures thereof, L is selected from the group consisting of the trivalent cations of the lanthanides, Al, In, Ga, Sc, and mixtures thereof, and A is selected from the group consisting of the alkali metal ions and mixtures thereof. Most advantageously, X is sulfur and L is selected from the group consisting of the trivalent lanthanide cations and mixtures thereof. This phosphor material undergoes a systematic blue shift in its emission maximum as the amount of L is increased from 0.05 to 5 mol % and undergoes a systematic red shift as the amount of A is increased from 0.05 to 5 mol %. The amount of copper can vary from 0.05 to 5.0 mol % copper, but need not be changed in order to vary the emission maximum. In a particular embodiment the combined amount of L and A is equal to the amount of copper. This phosphor material can also be used in luminescent devices.

Advantageously a luminescent device includes both a phosphor material of the formula $Zn_{1-3x/2}M_xX:Mn$ and a phosphor material of the formula MX:Cu, L, A.

A luminescent device can be made by providing a suitable substrate and applying to the substrate at least one phosphor material selected from the group consisting of phosphor materials of the formula $Zn_{1-3x/2}M_xX:Mn$ and phosphor materials of the formula, MX:Cu, L, A.

DETAILED DESCRIPTION

ZnMX:Mn Phosphor Systems

A phosphor material, useful in luminescent devices, is of the formula $Z_{1-3x/2}M_xX:Mn$, wherein M is selected from the group consisting of the trivalent cations of Al, In, Ga, and mixtures thereof, and X is selected from the group consisting of S, Se, Te, and mixtures thereof. Most advantageously X is sulfur. The phosphor material exhibits a systematic red shift of its emission as x varies from 0.01 to 0.49. The amount of Mn can be 0.5 to 5.0 mol %, but control of the emission maximum is achieved by changing the amount of trivalent cation.

A consideration of the electronic energy levels of the $d^5$ cation, $Mn^{2+}$, reveals that an increase in the crystal field strength will lead to a decrease in the separation of the energy levels and a red shift in its emission. An increase in the crystal field strength may be effectuated by substituting $Zn^{2+}$ ions with more highly charged trivalent cations, for example $Al^{3+}$ or $Ga^{3+}$. Such substitutions yield cation vacancies within the crystal lattice. To maintain charge compensation on substitution, Zn defects will be formed, thereby lowering the coordination of some sulfur atoms. Such sulfur atoms will bond more strongly to Mn 2+ ions in comparison to those sulfur atoms not associated with a Zn vacancy. The increased binding strength leads to a stronger crystal field and a red shift in the emission from the Mn2+ ions. The method also includes monitoring the luminescence of phoshors made in accordance with the crystal engineering approach to select compositions with the desired chromaticity.

Figure 1:
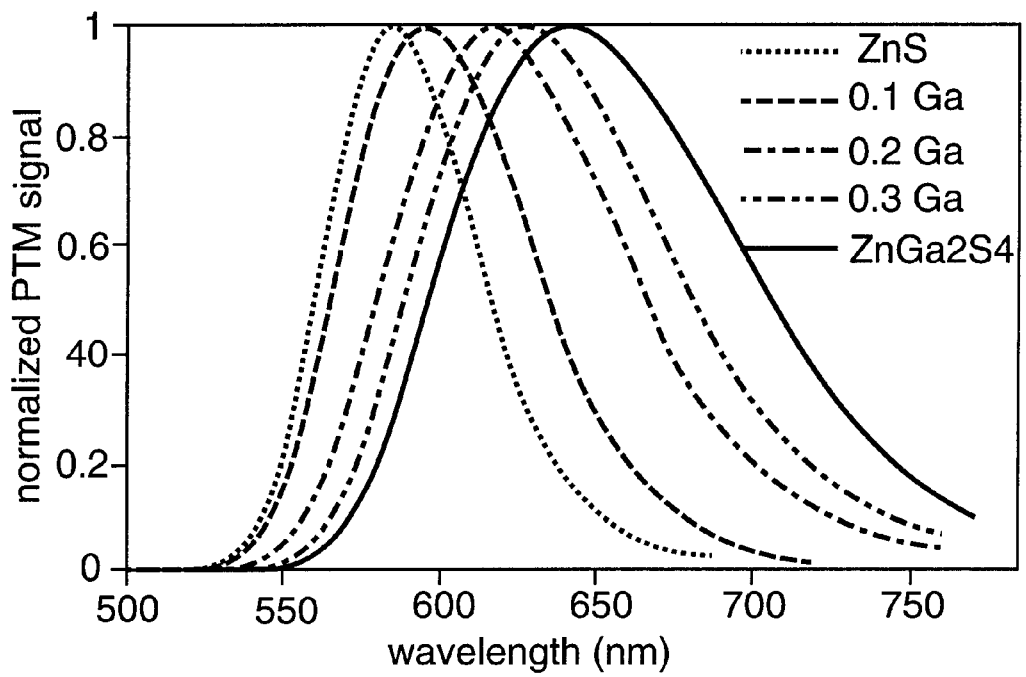
FIG. 1 shows the photoemission spectra for a series of $Zn_{1-3x/2}Ga_xX:Mn$ phosphors where the Mn concentration is held at 1 at % and x is varied in the range $0 \leq x \leq 0.5$. Actual concentrations of Ga are as shown.

As shown in FIG. 1, the emission wavelength of the ZnS:Mn phosphor can be specifically controlled in the system $Zn_{1-3x/2}Ga_xS:Mn$, i.e., a systematic wavelength shift was observed with increasing Ga concentration. Powder samples prepared at 1123K according to flux methods known in the art, revealed a decrease in the volume of the hexagonal cell of ZnS from 79.5 $Å^3$(x=0) to 77$Å^3$(x=0.35) as $Ga^{3+}$ ions were introduced. Luminescent decay times and chromaticity values for a series of Ga substituted ZnS:Mn phosphors are shown below in Table 1. The decay times were adequately fit by single-exponential functions and the lifetimes derived therefrom were consistent with direct emission from Mn centers. The composition $Zn_{0.55}Ga_{0.3}S:Mn$ yielded a true red phosphor as evidenced by its chromaticity values of x=0.64 and y=0.36. A similar red shift in emission upon substitution of $Zn^{2+}$ with $Al^{3+}$ has been observed. The luminescent lifetimes and chromaticity values for the $Zn_{1-3x/2}Ga_xS$:1 at % Mn phosphors are summarized in Table 1.

TABLE 1

Luminescent lifetimes and chromaticity values for $Zn_{1-3x/2}Ga_xS$: 1 at % Mn.

| | X | lifetime | Chromaticity (x,y) |
|---|---|---|---|
| ZnS | 0 | 0.85 ms | 0.54, 0.46 |
| $Zn_{0.85}Ga_{0.1}S$ | 0.1 | 0.75 ms | 0.58, 0.43 |
| $Zn_{0.7}Ga_{0.2}S$ | 0.2 | 0.83 ms | 0.62, 0.38 |
| $Zn_{0.55}Ga_{0.3}S$ | 0.3 | 0.75 ms | 0.64, 0.36 |

A phosphor composition that exhibits a luminescence spectrum with a target wavelength maximum can be produced by providing a first codoped zinc chalcogenide phosphor of the formula $Zn_{1-3x/2}M_xX:Mn$, wherein M is selected from the group consisting of the trivalent ions of Al, In, Ga, and mixtures thereof, and X is selected from the group consisting of S, Se, Te, and mixtures thereof. A luminescence spectrum of a sample of the first phosphor composition conforming to the formula $Z_{1-3x/2}M_xX:Mn$ is then measured. Next it is determined whether the first phosphor composition has a wavelength of maximum luminescence greater or less than the target wavelength. A sample of a second phosphor composition is then prepared, with the second phosphor composition having an adjusted t amount of M as compared to the first phosphor composition wherein the amount of M is decreased if the luminescence spectrum of the first phosphor composition exhibits a wavelength of maximum luminescence greater than the target wavelength maximum and the amount of M is decreased as compared to the first phosphor composition if the luminescence spectrum of the first phosphor composition exhibits a wavelength of maximum luminescence less than the target wavelength maximum. A luminescence spectrum of the second phosphor composition is measured and compared to the target wavelength. The process can be repeated with additional adjusted phosphor compositions until a phosphor composition exhibiting a wavelength of maximum luminescence that matches the target wavelength is prepared.

A phosphor composition that exhibits a luminescence spectrum with a target wavelength maximum also can be produced by. preparing a plurality of phosphor samples of the formula $Zn_{1-3/2}M_xX:Mn$ wherein the identity of M and X are fixed, the ratio of M to Zn varies, the amount of manganese is held constant, M is selected from the group consisting of the trivalent ions of Al, In, Ga, and mixtures thereof, and X is selected from the group consisting of S, Se, Te, and mixtures thereof. The wavelength of maximum luminescence is measured for each member of the plurality of phosphor samples. A calibration curve, which relates the ratio of M to Zn to the wavelength of maximum luminescence, is prepared. The ratio of M to Zn predicted to achieve the target wavelength maximum is determined from the calibration curve. A phosphor of the predicted composition is then prepared.

MX:Cu, L, A Phosphor Systems

Another phosphor material, useful in luminescent devices, is of the formula MX:Cu, L, A wherein M is selected from the divalent ions of Sr, Mg, Ca, Ba, and mixtures thereof, X is selected from the group consisting of S, Se, Te, and mixtures thereof, L is selected from the group consisting of the trivalent cations of the lanthanides, Al, In, Ga, Sc, and mixtures thereof, and A is selected from the group consisting of the alkali metal ions and mixtures thereof. Most advantageously, X is sulfur and L is selected from the group consisting of the trivalent lanthanide cations and mixtures thereof. This phosphor material undergoes a systematic blue shift in its emission maximum as the amount of L is increased from 0.05 to 5 mol % and undergoes a systematic red shift as the amount of A is increased from 0.05 to 5 mol %. The amount of copper can vary from 0.05 to 5.0 mol % copper, but need not be changed in order to vary the emission maximum. In a particular embodiment the combined amount of L and A is equal to the amount of copper.

Chromatic control in the SrS:Cu system was achieved by altering the coordination number of the Cu ions. Because the copper ions enter the lattice in the +1 oxidation state, Cu doping results in the formation of sulfur vacancies. The presence of sulfur vacancies results in two types of Cu sites; one without an adjacent sulfur vacancy (six-coordinate Cu) and one with an adjacent S vacancy (five-coordinate Cu). Rather than creating sulfur vacancies by increasing the copper concentration, it was discovered that monovalent and trivalent codopants could be used to increase or decrease the number of sulfur vacancies, respectively.

Figure 2:
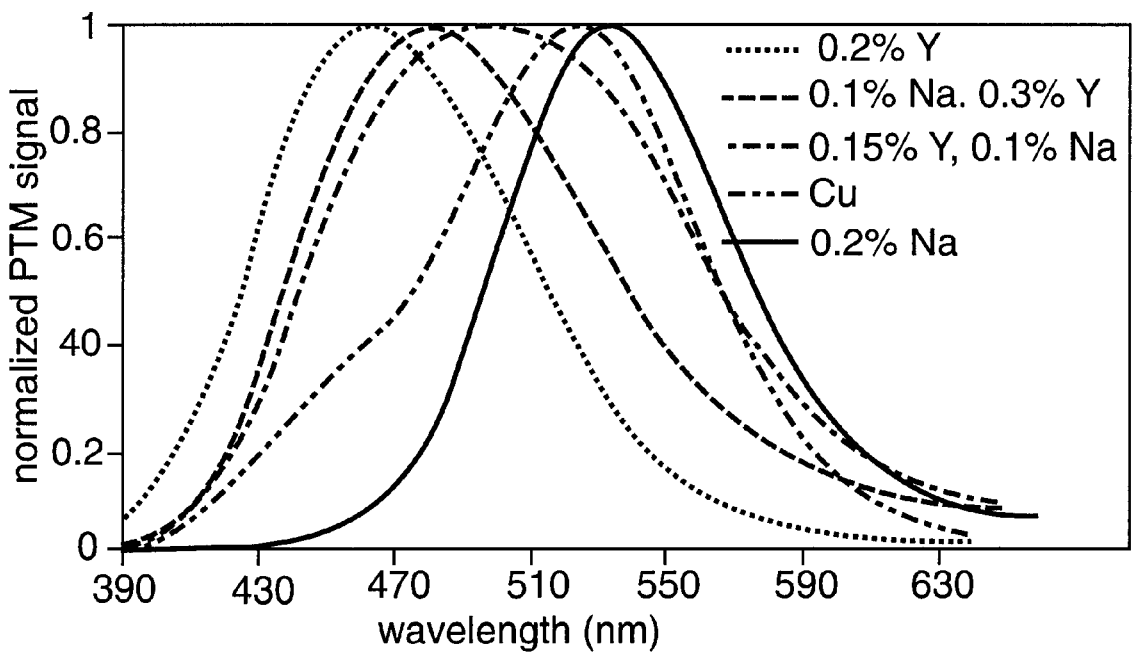
FIG. 2 shows the photoemission spectra for SrS:Cu codoped with Na and Y where the Cu concentration is held at 0.2 at %. Concentrations of Na and Y are as shown.

In accordance with this discovery, SrS:Cu powder phosphors exhibiting controlled emission wavelengths spanning the blue and green regions of the spectrum were prepared (FIG. 2). In contrast to prior art phosphor compositions, these colors were achieved by fixing the $Cu^+$ concentration, for example at 0.2 at %, and carefully adjusting the concentrations of the monovalent and trivalent codopants. Other copper concentrations may be used. Charge compensation of $Cu^+$ by incorporation of a trivalent cation, such as $Y^{3+}$ for example, into the NaCl-type host lattice of SrS preserves a six-coordinate environment for the $Cu^+$, leading to a predominant blue emission. Incorporation of a sufficient quantity of monovalent cations, such as $Na^+$ or other alkali-metal cations for example, leads to an increased formation of sulfur vacancies and a green emission. By varying the relative concentrations of the monovalent and trivalent codopants the concentration for the two types of emission centers and the resulting emission color can be controlled. The method also includes monitoring the luminescence of phosphors made in accordance with the crystal engineering approach to select compositions with the desired chromaticity.

A phosphor composition that exhibits a luminescence spectrum with a target wavelength maximum can be produced by providing a first codoped alkaline earth chalcogenide phosphor composition of the formula MX:Cu. L, A wherein M is selected from the divalent ions of Sr, Mg, Ca, Ba, and mixtures thereof, X is selected from the group consisting of S, Se, Te, and mixtures thereof, L is selected from the group consisting of the trivalent cations of the lanthanides, Al, In, Ga, Sc, Y, and mixtures thereof, and A is selected from the group consisting of the alkali metal ions and mixtures thereof. A luminescence spectrum of a sample of the first phosphor composition is then measured. Next it is determined whether the first phosphor composition has a wavelength of maximum luminescence greater or less than the target wavelength. A sample of a second phosphor composition is then prepared, with the second phosphor composition having an adjusted amount of L relative to the amount of A wherein the amount of L is increased relative to the amount of A as compared to the first phosphor composition if the luminescence spectrum of the first phosphor composition exhibits a wavelength of maximum luminescence greater than the target wavelength maximum and the amount of L is decreased relative to the amount of A as compared to the first phosphor composition if luminescence spectrum of the first phosphor composition exhibits a wavelength of maximum luminescence less than the target wavelength maximum. A luminescence spectrum of the second phosphor composition is measured and compared to the target wavelength. The process can be repeated with additional adjusted phosphor compositions until a phosphor composition exhibiting a wavelength of maximum luminescence that matches the target wavelength is prepared. In some embodiments of this process, the combined amount of L and A is held constant. In some embodiments of this process the aggregate amount of L and A is equal to the amount of copper codopant.

A phosphor that will exhibit a luminescence spectrum with a target maximum wavelength also can be produced by preparing a plurality of phosphor compositions of the formula MX:Cu, L, A wherein the identity of M and X are fixed, the combined amount of L and A is held constant, the ratio of L and A is varied, the amount of copper is held constant, M is selected from the divalent ions of Sr, Mg, Ca, Ba, and mixtures thereof, X is selected from the group consisting of S, Se, Te, and mixtures thereof, L is selected from the group consisting of the trivalent cations of the lanthanides, Al, In, Ga, Sc, Y, and mixtures thereof, and A is selected from the group consisting of the alkali metal ions and mixtures thereof. The wavelength of maximum luminescence is measured for each member of the plurality of phosphor samples. A calibration curve which relates the ratio of L to A to the wavelength of maximum luminescence is prepared. The calibration curve is used to determine the ratio of L to A predicted to achieve the target wavelength maximum. A phosphor of the predicted composition is then prepared.

Devices

Light emitting phosphor materials according to the present invention can be used in a variety of electroluminescent display devices. In particular the phosphor materials can be used in ACTFEL devices of the type described in U.S. Pat. No. 5,939,825, incorporated herein by reference. Such ACTFEL devices have front and rear electrode sets, a pair of insulators between the front and rear electrode sets. A thin film electroluminescent laminar stack, which includes a body of phosphor material in a layer, is provided between the insulators.

To provide such a device, a SrS:Cu,F thin-film phosphor layer with a thickness of 800–1000 nm was deposited onto a glass substrate coated with layers of indium tin oxide and aluminum-titanium oxide, which serve as the bottom transparent contact and the bottom insulator, respectively of the ACTFEL devices. The SrS:Cu,F deposition was accomplished by electron-beam evaporation of SrS and simultaneous thermal co-evaporation of $CuF_2$. Next, a thin layer of the appropriate alkali-metal fluoride coactivator, for example LiF, NaF, KF, RbF, or CsF, was deposited by thermal evaporation. Subsequently, rapid thermal annealing of the layers was performed at about 800° C. for about 2 minutes. Finally, a top insulating layer of silicon oxynitride was deposited by plasma-enhanced chemical vapor deposition, and aluminum dots were thermally evaporated as the top contact.

Figure 3:
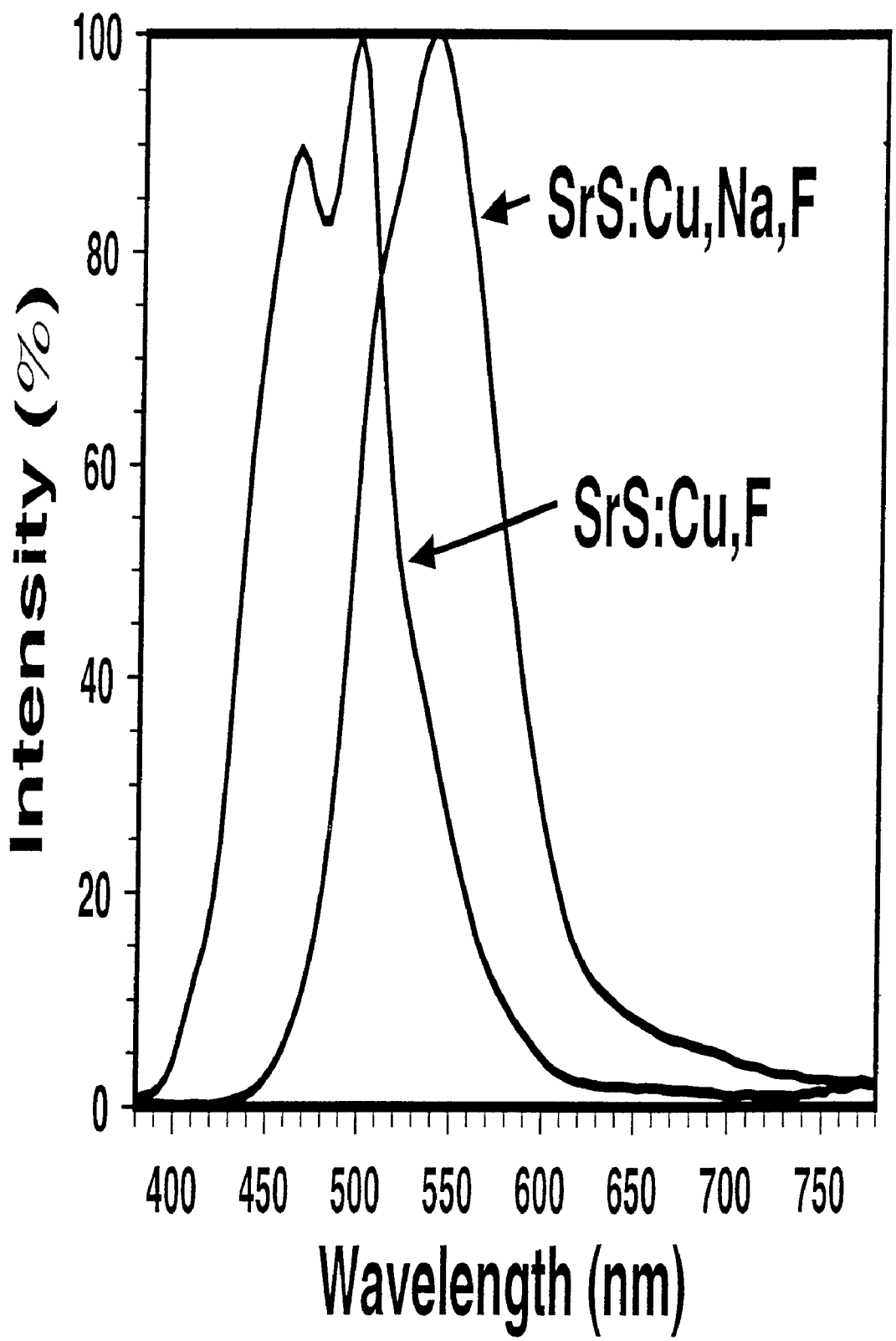
FIG. 3 presents normalized electroluminescence spectra for a coactivated SrS:Cu,Na,F (green) and a non-coactivated SrS:Cu,F (blue) ACTFEL device.

FIG. 3 shows a comparison of the EL spectra of a coactivated SrS:Cu,Na,F device of the invention and a non-coactivated SrS:Cu,F ACTFEL device. Note the dramatic red shift of the coactivated devices into the green portion of the spectrum. The Commission Internationale de l'Eclairage (CIE) color coordinates (chromaticity) for the sodium fluoride coactivated device are CIEx=0.317 and CIEy=0.585, which are very close to that desired for an ideal green phosphor (i.e. CIEx=0.30, CIEy=0.60). The chromaticity values of this and other alkali-metal coactivated SrS:Cu,F devices are summarized in comparison to the non-coactivated SrS:Cu,F device in Table 2 below.

Figure 4:
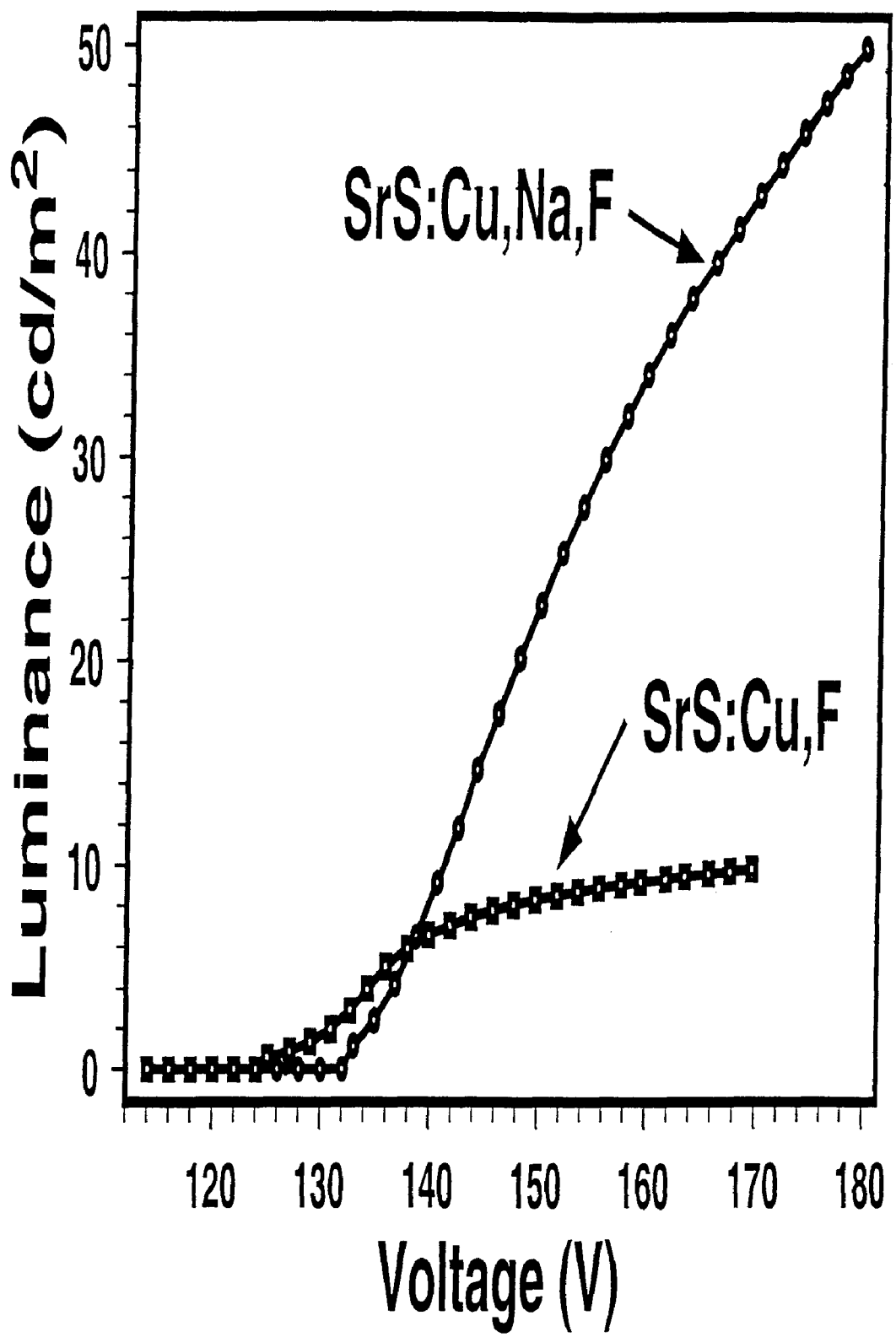
FIG. 4 shows the Luminance-voltage (L-V) curves at 60 Hz for a coactivated SrS:Cu,Na,F (green) and a non-coactivated SrS:Cu,F (blue) ACTFEL device.
Figure 5:
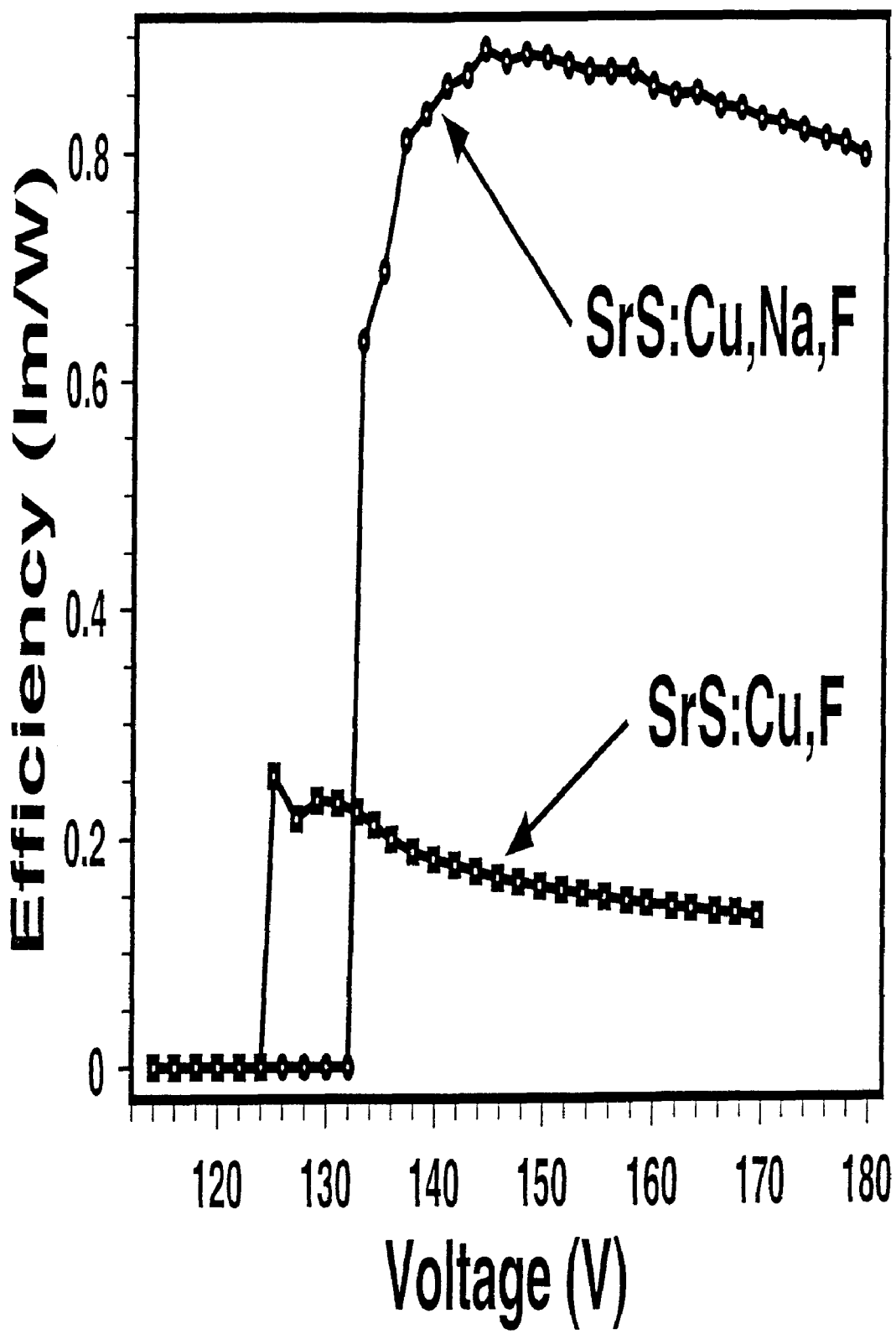
FIG. 5 shows the Efficiency-voltage (E-V) curves at 60 Hz for a coactivated SrS:Cu,Na,F (green) and a non-coactivated SrS:Cu,F (blue) ACTFEL device.

The EL luminance-voltage (L-V) and efficiency-voltage (–V) characteristics for a sodium-coactivated SrS:Cu,F device and a non-coactivated SrS:Cu,F device are shown in FIGS. 4 and 5 respectively. Upon coactivation, a dramatic increase in brightness and improvement in efficiency are evident. A summary of the luminance (L40) and efficiency (E40) for each of the alkali metal coactivated SrS:Cu,F devices and the non-coactivated device is presented in Table 2. All luminance and efficiency measurements were obtained 40 V above threshold at 60 Hz, using bipolar trapezoidal voltage pulses with 5 $\mu$s rise and fall times and a width of 30 $\mu$s.

TABLE 2

| Phosphor | L40 (cd/m$^2$)) | E40 (lm/W) | CIEx | CIEy |
| --- | --- | --- | --- | --- |
| SrS:Cu,F | 9.57 | 0.136 | 0.164 | 0.268 |
| SrS:Cu,Li,F | 4.53 | 0.054 | 0.293 | 0.561 |
| SrS:Cu,Na,F | 45.8 | 0.819 | 0.317 | 0.585 |
| SrS:Cu,K,F | 52.7 | 0.973 | 0.289 | 0.596 |
| SrS:Cu,Rb,F | 30.6 | 0.193 | 0.285 | 0.577 |
| SrS:Cu,Cs,F | 21.6 | 0.138 | 0.291 | 0.577 |

The increased brightness and efficiency of the coactivated devices is partially due to improvements in phosphor crystallinity and diffuse reflectance. The improvement in crystallinity was confirmed by X-ray diffraction. The increased diffuse reflectance was deduced visually from the milky appearance of the coactivated phosphor when compared to the non-coactivated phosphor. Improved crystallinity leads to more efficient electron transport and radioactive recombination in the phosphor and increased diffuse reflectance improves optical coupling.

Figure 6:
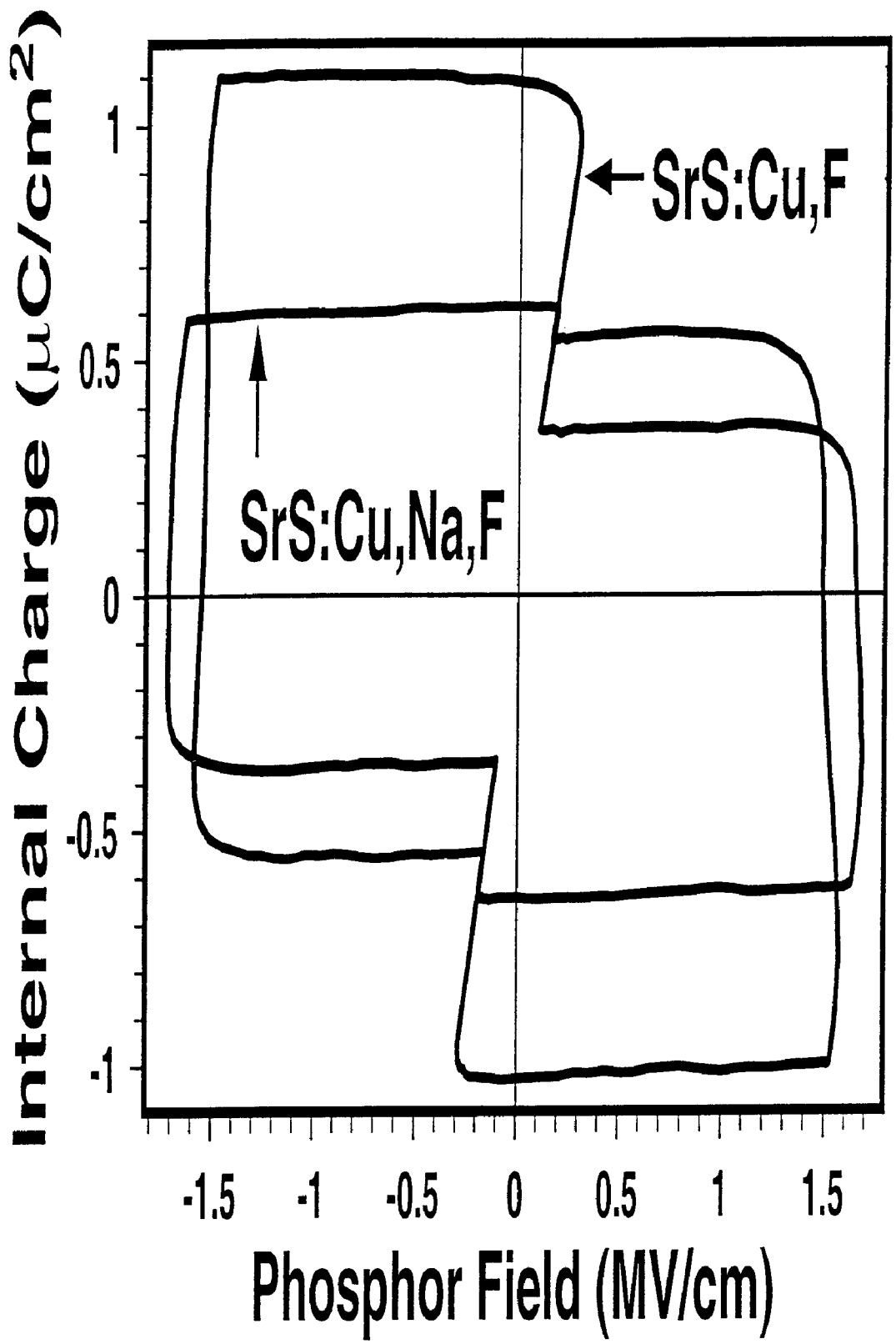
FIG. 6 shows the internal charge-phosphor field (Q-$F_p$) curves at 60 Hz and an overvoltage of 40V above threshold, for a coactivated SrS:Cu,Na,F (green) and a non-coactivated SrS:Cu,F (blue) ACTFEL device.

Coactivator treatment also leads to an improvement in the electrical characteristic of the ACTFEL devices. The internal charge-phosphor field ($Q-F_p$) characteristics of a sodium coactivated SrS:Cu,F device and a non-coactivated SrS:Cu,F device are compared in FIG. 6. In comparison the coactivated device shows less charge being transported across the phosphor even though the luminance of this device is greater. Less power is dissipated in the coactivated device as established by the smaller area enclosed by the Q-$F_p$ curve. The steady-state phosphor field of the green device is greater than that of the non-coactivated device and shows less overshoot. These last observations taken together imply that the electric field is larger and more uniform across the phosphor for the coactivated device, leading to a greater luminance.

The preceding examples are set forth to illustrate the invention and are not intended to limit it. Additional embodiments and advantages within the scope of the claimed invention will be apparent to one of ordinary skill in the art. For example, the phosphor materials can be used in devices other than ACTFEL devices.

We claim:

1. An alternating current thin-film electroluminesent device comprising:
   a pair of dielectric layers suitable to substantially prevent DC current from flowing therebetween; and
   a body of a phosphor material located between the dielectric layers, the phosphor material being of the formula $Z_{1-3x/2}M_xX$:Mn wherein M is selected from the group consisting of the trivalent ions of Al, In, Ga, and mixtures thereof, X is selected from the group consisting of S, Se, Te, and mixtures thereof, and x is 0.01 to 0.49.

2. A phosphor material of the formula MX:Cu, L, A wherein M is selected from the divalent ions of Sr, Mg, Ca, Ba, and mixtures thereof, X is selected from the group consisting of S, Se, Te, and mixtures thereof, L is selected from the group consisting of the trivalent cations of the lanthanides, Al, In, Ga, Sc, Y, and mixtures thereof, A is selected from the alkali metal ions and mixtures thereof, L is 0.05 to 5 mol %, and A is 0.05 to 5 mol %.

3. A phosphor material of claim 2 wherein the material contains 0.05 to 5.0 mol % copper.

4. A phosphor material of claim 2 wherein:
   L is selected from the group consisting of the trivalent lanthanide cations and mixtures thereof; and
   X is sulfur.

5. A phosphor material of the formula MX:Cu, L, A wherein M is selected from the divalent ions of Sr, Mg, Ca, Ba, and mixtures thereof, X is selected from the group consisting of S, Se, Te, and mixtures thereof, L is selected from the group consisting of the trivalent cations of the lanthanides, Al, In, Ga, Sc, Y, and mixtures thereof, A is selected from the alkali metal ions and mixtures thereof, and the combined amount of L and A is equal to the amount of copper.

6. A luminescent device comprising a phosphor material of the formula, MX:Cu, L, A wherein M is selected from the divalent ions of Sr, Mg, Ca, Ba, and mixtures thereof, X is selected from the group consisting of S, Se, Te, and mixtures thereof, L is selected from the group consisting of the trivalent cations of the lanthanides, Al, In, Ga, Sc, Y, and mixtures thereof, and A is selected from the group consisting of the alkali metal ions and mixtures thereof, where L is 0.05 to 5 mol % and A is 0.05 to 5 mol %.

7. An alternating current thin-film electroluminescent device comprising:
   a pair of dielectric layers suitable to substantially prevent DC current from flowing therebetween; and
   a body of a phosphor material located between the dielectric layers, the phosphor material being of the formula MX:Cu, L, A wherein M is selected from the divalent ions of Sr, Mg, Ca, Ba, and mixtures thereof, X is selected from the group consisting of S, Se, Te, and mixtures thereof, L is selected from the group consisting of the trivalent cations of the lanthanides, Al, In, Ga, Sc, Y, and mixtures thereof, and A is selected from the alkali metal ions and mixtures thereof.

8. A luminescent device comprising:
   at least one phosphor material selected from the group consisting of a phosphor of the formula $Zn_{1-3x/2}M_xX$:Mn wherein M is selected from the group consisting of the trivalent ions of Al, In, Ga, and mixtures thereof, X is selected from the group consisting of S, Se, Te, and mixtures thereof, and x is 0.01 to 0.49; and
   at least one phosphor material of the formula, MX:Cu, L, A wherein M is selected from the divalent ions of Sr, Mg, Ca, Ba, and mixtures thereof, X is selected from the group consisting of S, Se, Te, and mixtures thereof, L is selected from the group consisting of the trivalent cations of the lanthanides, Al, In, Ga, Sc, Y, and mixtures thereof, A is selected from the group consisting of the alkali metal ions and mixtures thereof, L is 0.05 to 5 mol %, and A is 0.05 to 5 mol %.

9. The luminescent device of claim 8 wherein:
   L is selected from the group consisting of the trivalent lanthanide cations and mixtures thereof; and
   X is sulfur in both phosphor materials.

10. An alternating current thin-film electroluminescent device comprising:
    a pair of dielectric layers suitable to substantially prevent DC current from flowing therebetween; and
    a body of a phosphor material located between the dielectric layers, the phosphor material comprising (a) at least one phosphor material selected from the group consisting of a phosphor of the formula $Z_{1-3x/2}M_xX$:Mn wherein M is selected from the group consisting of the trivalent ions of Al, In, Ga, and mixtures thereof, X is selected from the group consisting of S, Se, Te, and mixtures thereof, and x is 0.1 to 0.49, and (b) at least one phosphor material of the formula MX:Cu, L, A wherein M is selected from the divalent ions of Sr, Mg, Ca, Ba, and mixtures thereof, X is selected from the group consisting of S, Se, Te, and mixtures thereof, L is selected from the group consisting of the trivalent cations of the lanthanides, Al, In, Ga, Sc, Y, and mixtures thereof, and A is selected from the group consisting of the alkali metal ions and mixtures thereof.

11. The method of providing a luminescent device, the method comprising:
    providing a substrate; and
    applying to the substrate at least one phosphor material selected from the group consisting of phosphor materials of the formula MX:Cu, L, A wherein M is selected from the divalent ions of Sr, Mg, Ca, Ba, and mixtures thereof, X is selected from the group consisting of S, Se, Te, and mixtures thereof, L is selected from the group consisting of the trivalent cations of the lanthanides, Al, In, Ga, Sc, Y, and mixtures thereof, and A is selected from the alkali metal ions and mixtures thereof, L is 0.05 to 5 mol %, and A is 0.05 to 5 mol %.

12. A method of producing a phosphor composition that exhibits a luminescence spectrum with a target wavelength maximum, comprising:
    a) providing a first codoped alkaline earth chalcogenide phosphor composition of the formula MX:Cu, L, A wherein M is selected from the divalent ions of Sr, Mg, Ca, Ba, and mixtures thereof, X is selected from the group consisting of S, Se, Te, and mixtures thereof, L is selected from the group consisting of the trivalent cations of the lanthanides, Al, In, Ga, Sc, Y, and mixtures thereof, and A is selected from the group consisting of the alkali metal ions and mixtures thereof;

b) measuring a luminescence spectrum of a sample of the first phosphor composition;

c) determining if the first phosphor composition has a wavelength of maximum luminescence greater or less than the target wavelength;

d) preparing a sample of a second phosphor composition with an adjusted amount of L relative to the amount of A wherein the amount of L is increased relative to the amount of A as compared to the first phosphor composition if the luminescence spectrum of the first phosphor composition exhibits a wavelength of maximum luminescence greater than the target wavelength maximum and the amount of L is decreased relative to the amount of A as compared to the first phosphor composition if luminescence spectrum of the first phosphor composition exhibits a wavelength of maximum luminescence less than the target wavelength maximum; and e) repeating steps b through d until a phosphor composition exhibiting a wavelength maximum luminescence that matches the target wavelength is prepared.

13. The method of claim 12 wherein the combined amount of L and A is held constant.

14. The method of claim 13 wherein the aggregate amount of L and A is equal to the amount of copper codopant.

15. A method of producing a phosphor that will exhibit a luminescence spectrum with a target maximum wavelength, comprising:

a) preparing a plurality of phosphor compositions of the formula MX:Cu, L, A wherein the identity of M and X are fixed, the combined amount of L and A is held constant, the ratio of L and A is varied, the amount of copper is held constant, M is selected from the divalent ions of Sr, Mg, Ca, Ba, and mixtures thereof, X is selected from the group consisting of S, Se, Te, and mixtures thereof, L is selected from the group consisting of the trivalent cations of the lanthanides, Al, In, Ga, Sc, Y, and mixtures thereof, and A is selected from the group consisting of the alkali metal ions and mixtures thereof;

measuring the wavelength of maximum, luminescence for each member of the plurality of phosphor samples;

preparing a calibration curve which relates the ratio of L to A to the wavelength of maximum luminescence;

determining from the calibration curve the ratio of L to A predicted to achieve the target wavelength maximum; and preparing a phosphor of the predicted composition.

16. A method of producing a phosphor composition that exhibits a luminescence spectrum with a target wavelength maximum, comprising:

a) providing a first codoped-zinc chalcogenide phosphor of the formula, $Zn_{1-3x/2}M_xX$:Mn, wherein M is selected from the group consisting of the trivalent ions of Al, In, Ga, and mixtures thereof, X is selected from the group consisting of S, Se, Te, and mixtures thereof, and x is 0.01 to 0.49;

b) measuring a luminescence spectrum of a sample of the first phosphor composition conforming to the formula $Zn_{1-3x/2}M_xX$:Mn;

c) determining if the first phosphor composition has a wavelength of maximum luminescence greater or less than the target wavelength;

d) preparing a sample of a second phosphor composition with an adjusted amount of M as compared to the first phosphor composition wherein the amount of M is decreased if the luminescence spectrum of the first phosphor composition exhibits a wavelength of maximum luminescence greater than the target wavelength maximum and the amount of M is decreased as compared to the first phosphor composition if the luminescence spectrum of the first phosphor composition exhibits a wavelength of maximum luminescence less than the target wavelength maximum; and e) repeating steps b through d until a phosphor composition exhibiting a wavelength of maximum luminescence that matches the target wavelength is prepared.

17. A method of producing a phosphor compositions that exhibits a luminescence spectrum with a target wavelength maximum, comprising:

preparing a plurality of phosphor samples of the formula $Z_{1-3x/2}M_xX$:Mn wherein the identity of M and X are fixed, the ratio of M to Zn varies, the amount of manganese is held constant, M is selected from the group consisting of the trivalent ions of Al, In, Ga, and mixtures thereof, X is selected from the group consisting of S, Se, Te, and mixtures thereof, and x is 0.01 to 0.49;

measuring the wavelength of maximum luminescence for each member of the plurality of phosphor samples;

preparing a calibration curve which relates the ratio of M to Zn to the wavelength of maximum luminescence;

determining from the calibration curve the ratio of M to Zn predicted to achieve the target wavelength maximum; and preparing a phosphor of the predicted composition.

18. The phosphor material of claim 2 wherein the combined amount of L and A is equal to the amount of copper.

19. A luminescent device comprising a phosphor material of the formula, MX:Cu, L, A wherein M is selected from the divalent ions of Sr, Mg, Ca, Ba, and mixtures thereof, X is selected from the group consisting of S, Se, Te, and mixtures thereof, L is selected from the group consisting of the trivalent cations of the lanthanides, Al, In, Ga, Sc, Y, and mixtures thereof, A is selected from the group consisting of the alkali metal ions and mixtures thereof, and the combined amount of L and A is equal to the amount of copper.

20. A luminescent device comprising:

at least one phosphor material selected from the group consisting of a phosphor of the formula $Z_{1-3x/2}M_xX$:Mn wherein M is selected from the group consisting of the trivalent ions of Al, In, Ga, and mixtures thereof, X is selected from the group consisting of S, Se, Te, and mixtures thereof, and x is 0.01 to 0.49; and at least one phosphor material of the formula MX:Cu, L, A wherein M is selected from the divalent ions of Sr, Mg, Ca, Ba, and mixtures thereof, X is selected from the group consisting of S, Se, Te, and mixtures thereof, L is selected from the group consisting of the trivalent cations of the lanthanides, Al, In, Ga, Sc, Y, and mixtures thereof, A is selected from the group consisting of the alkali metal ions and mixtures thereof, and the combined amount of L and A is equal to the amount of copper.

21. The method of providing a luminescent device, the method comprising:

providing a substrate; and applying to the substrate at least one phosphor material selected from the group consisting of phosphor materials of the formula MX:Cu, L, A wherein M is selected from the divalent ions of Sr, Mg, Ca, Ba, and mixtures thereof, X is selected from the group consisting of S, Se, Te, and mixtures thereof, L is selected from the group consisting of the trivalent cations of the lanthanides, Al, In, Ga, Sc, Y, and mixtures thereof, A is selected from the alkali metal ions and mixtures thereof, and the combined amount of L and A is equal to the amount of copper.

* * * * *